US010046396B2

(12) United States Patent
Kobayashi (10) Patent No.: US 10,046,396 B2
(45) Date of Patent: Aug. 14, 2018

(54) CUTTING INSERT, CUTTING TOOL, AND METHOD FOR MANUFACTURING MACHINED PRODUCT

(71) Applicant: KYOCERA Corporation, Kyoto-shi, Kyoto (JP)

(72) Inventor: Youji Kobayashi, Yasu (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 76 days.

(21) Appl. No.: 15/022,486

(22) PCT Filed: Sep. 30, 2014

(86) PCT No.: PCT/JP2014/076012
§ 371 (c)(1),
(2) Date: Mar. 16, 2016

(87) PCT Pub. No.: WO2015/046558
PCT Pub. Date: Apr. 2, 2015

(65) Prior Publication Data
US 2016/0228952 A1    Aug. 11, 2016

(30) Foreign Application Priority Data

Sep. 30, 2013 (JP) ................................. 2013-204363

(51) Int. Cl.
*B23B 27/16* (2006.01)
*B23B 27/14* (2006.01)

(52) U.S. Cl.
CPC ............ *B23B 27/143* (2013.01); *B23B 27/16* (2013.01); *B23B 27/1607* (2013.01);
(Continued)

(58) Field of Classification Search
CPC .............. B23B 27/143; B23B 27/1607; B23B 27/1618; B23B 27/1648; B23B 27/16;
(Continued)

(56) References Cited

U.S. PATENT DOCUMENTS 3,557,416 A * 1/1971 Jones ................... B23B 27/143
407/114
4,189,265 A   2/1980 Arnold et al.
(Continued)

FOREIGN PATENT DOCUMENTS

GB   1355037 A   5/1974
JP   06-055312 A   3/1994
(Continued)

OTHER PUBLICATIONS

International Search Report (Form PCT/ISA/210) dated Jan. 6, 2015 and issued for PCT/JP2014/076012.

*Primary Examiner* — Ryan Rufo
(74) *Attorney, Agent, or Firm* — Volpe and Koenig, P.C.

(57) ABSTRACT

The cutting insert is provided with: a top surface, a bottom surface, a side surface, a cutting edge located at the intersection portion of the top surface and the side surface; a through hole located from the top surface to the bottom surface; a projecting portion extending from a corner section to a through hole side; and a rake surface located between the cutting edge and the projecting portion. A boundary line between the rake surface and the projecting portion comprises a first end. In a top view, a bisector of the corner section intersects the cutting edge at a first point and intersects a top edge section of the through-hole at a second point. The first end is located closer to the through-hole side than a perpendicular line that passes through a midpoint of a line segment connecting the first point and the second point.

18 Claims, 4 Drawing Sheets (52) U.S. Cl.
CPC . *B23B 2200/0447* (2013.01); *B23B 2200/081* (2013.01); *B23B 2200/085* (2013.01); *B23B 2200/286* (2013.01); *B23B 2200/321* (2013.01); *B23B 2260/104* (2013.01)

(58) Field of Classification Search
CPC ... B23B 27/14; B23B 27/22; B23B 2200/081; B23B 2200/321; B23B 2200/3618; Y10T 407/235
See application file for complete search history.

(56) References Cited

U.S. PATENT DOCUMENTS

| | | | | |
|---|---|---|---|---|
| 4,411,565 | A | * | 10/1983 | Hazra ................... B23B 27/143 407/114 |
| 4,856,942 | A | * | 8/1989 | Bernadic ............... B23B 27/143 407/114 |
| 5,116,167 | A | * | 5/1992 | Niebauer .............. B23B 27/143 407/114 |
| 5,122,017 | A | * | 6/1992 | Niebauer .............. B23B 27/143 407/114 |
| D404,744 | S | * | 1/1999 | Bernadic ...................... D15/139 |
| 6,217,264 | B1 | * | 4/2001 | Kim ...................... B23B 27/143 407/114 |
| 2001/0051077 | A1 | * | 12/2001 | Nagata ................... B23C 5/2221 407/35 |
| 2008/0219784 | A1 | * | 9/2008 | Yamazaki ............. B23B 27/143 407/114 |
| 2010/0275749 | A1 | * | 11/2010 | Kobayashi ........... B23B 27/143 83/13 |
| 2011/0033252 | A1 | * | 2/2011 | Nishida ................. B23B 27/143 407/114 |
| 2011/0229279 | A1 | * | 9/2011 | Kobayashi ........... B23B 27/143 407/115 |
| 2012/0177452 | A1 | * | 7/2012 | Konta ................... B23B 27/141 407/114 |
| 2012/0301234 | A1 | * | 11/2012 | Yamaguchi ........... B23B 51/048 407/100 |
| 2015/0078844 | A1 | * | 3/2015 | Majima ............... B23B 27/1607 407/114 |

FOREIGN PATENT DOCUMENTS

| | | | | |
|---|---|---|---|---|
| JP | 2000-280113 | A | * 10/2000 | ............... B23C 5/20 |
| JP | 2002-066812 | A | 3/2002 | |
| JP | 2000-084707 | A | * 3/2003 | ............ B23B 27/22 |
| JP | 2003-220503 | A | 8/2003 | |
| JP | 2007-075932 | A | * 3/2007 | ............ B23B 27/14 |
| JP | 2009-255230 | A | 11/2009 | |
| JP | 2011-115896 | A | 6/2011 | |
| JP | 2014-221500 | A | 11/2014 | |
| WO | 2009/028687 | A1 | 3/2009 | |
| WO | WO 2009128540 | A1 | * 10/2009 | ........... B23B 27/143 |

* cited by examiner

CUTTING INSERT, CUTTING TOOL, AND METHOD FOR MANUFACTURING MACHINED PRODUCT

TECHNICAL FIELD

The present invention relates to a cutting insert for cutting a workpiece, a cutting tool, and a method for manufacturing a machined product.

BACKGROUND ART

Examples of cutting tools configured to cut a workpiece such as a metal include cutting tools having a cutting insert mounted to a tip side of a holder.

The cutting insert disclosed in Patent Document 1 includes a breaker projecting portion and a rake surface in a corner section of a top surface of the cutting insert. The breaker projecting portion and the rake surface are disposed so as to be shorter than one-half a length between a cutting edge and an attachment hole. In the cutting insert disclosed in Patent Document 2 as well, a breaker and a rake surface are disposed so as to be shorter than one-half a length between a cutting edge and an attachment hole.

CITATION LIST

Patent Literature

Patent Document 1: Japanese Unexamined Patent Application Publication No. 2002-066812A
Patent Document 2: Japanese Unexamined Patent Application Publication No. 2011-115896A

SUMMARY OF INVENTION

Technical Problem

Nevertheless, in a cutting insert such as described above, a linear section of the cutting edge that is separated from the corner section also contributes to cutting under cutting conditions of a large depth of cut (large depth machining). Under such cutting conditions, chips produced by the cutting by the linear portion separated from the corner section directly hit the high breaker projecting portion, possibly causing a significant increase in cutting resistance. Further, under such cutting conditions, the chips may not be curled in a stable manner, causing clogging on the rake surface. As a result, the allowable depth of cut has been limited.

Here, an object of the present invention is to provide a cutting insert and a cutting tool exhibiting excellent chip dischargeability under a wide range of cutting conditions, and also being capable of reducing cutting resistance and increasing wear resistance.

Solution to Problem

A cutting insert of the present invention includes: a polygonal top surface, a bottom surface, a side surface that intersects the top surface and the bottom surface, a cutting edge located at an intersection portion of the top surface and the side surfaces, and provided to at least a corner section of the top surface; a through-hole provided from a center portion of the top surface to a center portion of the bottom surface; a projecting portion provided to the top surface and extending from a corner section side to a through-hole side; and a rake surface provided between the cutting edge and the projecting portion and extending from the corner section side to the through-hole side. In a top view, an end on the through-hole side of a boundary line between the rake surface and the projecting portion is located closer to the through-hole side than a perpendicular line that passes through a midpoint of a line segment connecting a top edge section of the through-hole and a tip of the corner section, a point corresponding to the top edge section of the through-hole on the line segment and a point corresponding to the tip of the corner section on the line segment is located on a bisector that bisects an angle formed by the corner section.

The cutting tool of the present invention includes a holder and the above-described cutting insert mounted to a tip side of the holder.

A method for manufacturing a machined product of the present invention includes: rotating a workpiece; bringing the cutting edge of the cutting tool into contact with the rotating workpiece; and separating the cutting tool from the workpiece.

Advantageous Effects of Invention

According to the present invention, it is possible to exhibit excellent chip dischargeability under a wide range of cutting conditions. As a result, a reduction in cutting resistance and an increase in wear resistance can be achieved.

DESCRIPTION OF EMBODIMENTS

Figure 1:
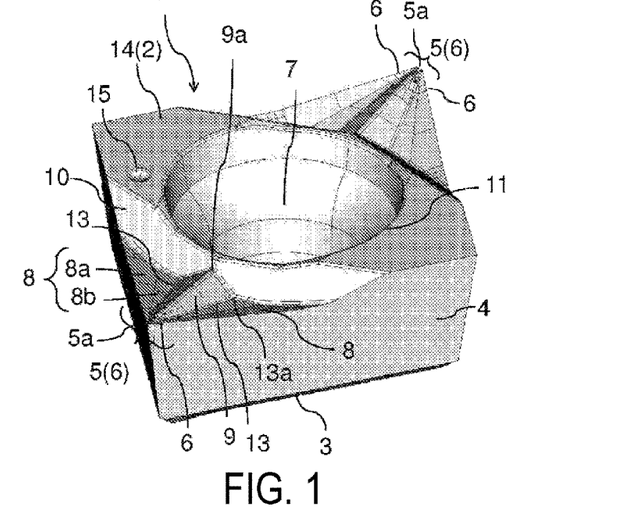
FIG. 1 is a schematic perspective view of an example of a cutting insert according to the present invention.
Figure 2A:
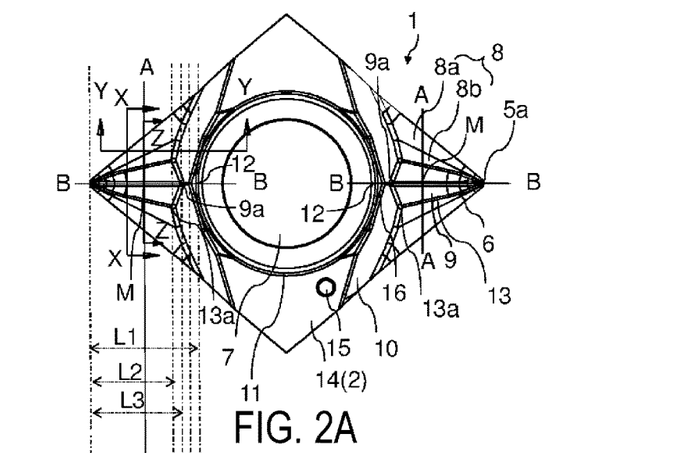
FIG. 2A is a plan view of the cutting insert in FIG. 1.
Figure 2B:
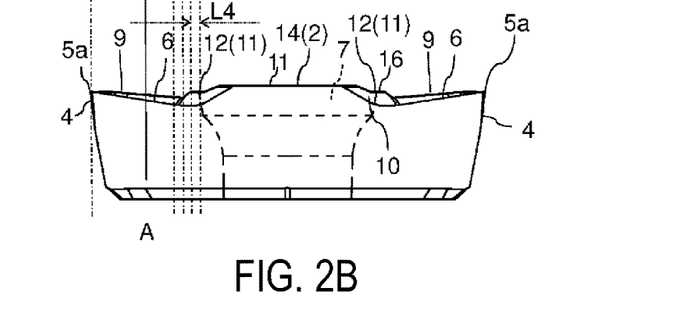
FIG. 2B is a side view of the cutting insert in FIG. 1.
Figure 3A:
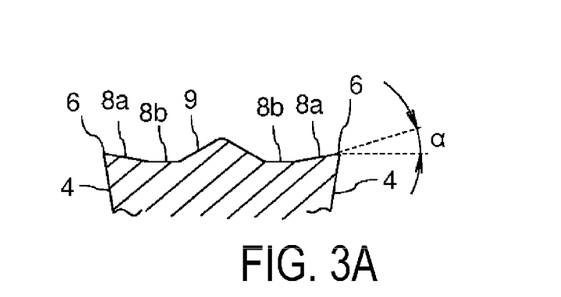
FIG. 3A is an X-X cross-sectional view of the cutting insert in FIG. 2A.
Figure 3B:
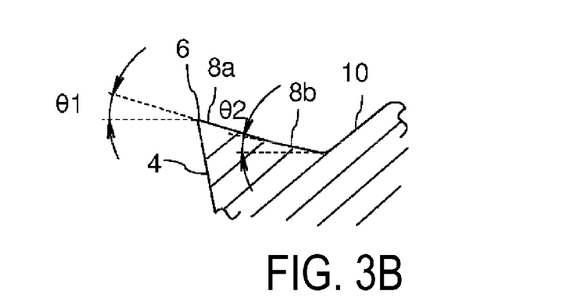
FIG. 3B is a Y-Y cross-sectional view of the cutting insert in FIG. 2A.

FIGS. 1 to 3 illustrate an insert 1 of the present embodiment. According to the present embodiment, the insert 1 has a flat plate shape, and includes a polygonal top surface 2, a bottom surface 3, and side surfaces 4 that intersect the top surface 2 and the bottom surface 3. The top surface 2 is substantially rhombic shaped (type C of ISO standard 9361). A cutting edge 6 that includes a corner section 5 of the top surface 2 is provided in two opposing locations on the top surface 2, at intersection portions of the top surface 2 and the side surfaces 4.

A through-hole 7 provided so as to extend from a center portion of the top surface 2 to a center portion of the bottom surface 3 is provided to the insert 1. A projecting portion 9 is provided to the top surface 2, extending from the corner section 5 side to the through-hole 7 side. A rake surface 8, continuous with the projecting portion 9, is provided between the cutting edge 6 and the projecting portion 9, extending from the corner section 5 side to the through-hole 7 side. According to FIGS. 1 to 3, the rake surface 8 of the insert 1 is provided adjacent to the cutting edge 6 of the top surface 2, and side ends of the rake surface 8 extend from the corner section 5 of the top surface 2 along two side surfaces. The projecting portion 9 is provided between these areas of the rake surface 8. In other words, the projecting portion 9 is located inward from the areas of the rake surface 8 of the top surface 2, and rises from the rake surface 8. That is, the rake surface 8 and the projecting portion 9 are adjacent to each other and have boundary lines 13. The boundary lines 13 each extend from the corner section 5 side to the through-hole 7 side, and include an end 13a on the through-hole 7 side. Note that the rake surface 8 also extends between the cutting edge 6 and the projecting portion 9 on a bisector B (hereinafter also referred to as the bisector B of the corner section 5) that bisects an angle formed by the corner section 5.

According to the present embodiment, as illustrated in the plan view in FIG. 2A, each of the ends 13a on the through-hole 7 side of the boundary lines 13 between the rake surface 8 and the projecting portion 9 is located closer to the through-hole 7 side than a perpendicular line A that passes through a midpoint M of a line segment connecting a top edge section (an intersection point 12 of the top edge section 11) of the through-hole 7 and a tip 5a of the corner section 5, a point corresponding to the top edge section of the through-hole 7 on the line segment and a point corresponding to the tip 5a of the corner section 5 on the line segment being located on the bisector B of the corner section 5. In other words, each of the ends 13a of the boundary lines 13 is located closer to the through-hole 7 side than the line (perpendicular line) A perpendicular to the bisector B that passes through the midpoint M of the line segment between the intersection point 12 of the top edge section 11 of the through-hole 7 and the bisector B of the corner section 5, and the tip 5a of the corner section 5. This makes it possible to achieve chip processing by large depth machining possible, chip processing under a wide range of cutting conditions from small depth machining to large depth machining possible, and efficient chip machining. Note that, in the present invention, the position of the top edge section 11 of the through-hole 7 is defined as the intersection of an extended line of an upper side inner wall surface of the through-hole 7 and an extended line of a flat surface area (position having the highest height on the bisector B) of the top surface 2.

In the present embodiment, the insert 1 includes a middle surface 14 serving as the periphery of the through-hole 7, in a position sandwiched by the two rake surfaces 8 extending from the two corner sections 5. The middle surface 14 is a flat surface parallel to the bottom surface 3.

Here, according to the present embodiment, as illustrated in FIGS. 2A and 2B, a ratio (L1/L2) of a projected length L2 of the bisector B, corresponding to the boundary line 13, which is a boundary line between the rake surface 8 and the projecting portion 9, between the end 13a and the tip of the corner section 5 (a length parallel to the bisector B between the end 13a of the boundary line 13 and the tip of the corner section 5), to a length L1 of the line segment (a length between the intersection point 12 of the bisector B of the corner section 5 and the top edge section 11 of the through-hole 7, and the tip 5a of the corner section 5) is from 60 to 85%. This, in particular, makes it possible to achieve chip processing under a wide range of cutting conditions as well as efficient cut processing.

Further, according to the present embodiment, a ratio (L3/L1) of a length L3 between an end 9a on the through-hole 7 side of a top ridge of the projecting portion 9 and the tip 5a of the corner section 5 to the line segment length L1 (the length between the intersection point 12 of the bisector B of the corner section 5 and the top edge section 11 of the through-hole 7, and the tip 5a of the corner section 5) is from 65 to 90%. That is, the rake surface 8 is disposed to an area near the end 9a of the projecting portion 9.

Here, according to the present embodiment, the length L2 is shorter than the length L3. Furthermore, according to the present embodiment, the ratio (L2/L3) of L2 to L3 is from 75 to 95%. This makes it possible to achieve a favorable chip flow, chip processing under a wide range of cutting conditions, and efficient cut processing.

Further, according to the present embodiment, a wall section 10 between the end 9a of the projecting portion 9 and the top edge section 11 of the through-hole 7 extends so as to come into contact with the rake surface 8. That is, the wall section 10 extends between the end 9a on the through-hole 7 side of the projecting portion 9 and the top edge section 11 of the through-hole 7, and across the area between the rake surface 8 and the middle surface 14. This, in particular, makes it possible to achieve chip processing under a wide range of cutting conditions as well as efficient cut processing.

According to the present embodiment, the wall section 10 extends so as to reach each of the two side surfaces 4 connected to the corner section 5. As a result, the chips deformed at the breaker of the rake surface 8 and the projecting portion 9 are smoothly discharged outside via the side surfaces 4.

The wall section 10 extends in directions from a side of the intersection point 12 toward a side of the side surface 4 connected to the corner section 5, so as to get away to the through-hole 7 side with respect to the perpendicular line A. As a result, the chips deformed at the breaker of the rake surface 8 and the projecting portion 9 are more smoothly discharged without strongly colliding with the wall section 10.

Here, the rake surface 8 is composed of two surfaces of a first rake surface 8a that comes into contact with the cutting edge 6, and a second rake surface 8b that comes into contact with the projecting portion 9. In a cross section (FIG. 3A, which is an X-X cross section of FIG. 2A, for example) of the corner section 5 in the perpendicular line A direction perpendicular to the bisector B, the first rake surface 8a is inclined downward from the cutting edge 6 toward the second rake surface 8b, and the second rake surface 8b has the same height from the first rake surface 8a to the projecting portion 9 with the bottom surface 3 serving as reference. An angle $\alpha$ of inclination (angle of inclination in the X-X cross section) of the first rake surface 8a in the perpendicular line A direction perpendicular to the bisector B is $5°\leq\alpha\leq20°$. Further, the first rake surface 8a and the second rake surface 8b are both inwardly inclined downward in a cross section (FIG. 3B, which is the Y-Y cross section of FIG. 2A, for example) parallel to the bisector B. Angles $\theta1$, $\theta2$ of inclination of the first rake surface 8a and the second rake surface 8b in the direction parallel to the bisector B are $10°\leq\theta1\leq20°$ and $3°\leq\theta2\leq15°$, respectively. This makes it possible to achieve a favorable chip flow, chip processing under a wide range of cutting conditions, and efficient cut processing. Note that the angles $\alpha$, $\theta1$, $\theta2$ of inclination are all angles with respect to the bottom surface 3.

Then, in a top view, the first rake surface 8a, the second rake surface 8b, and the projecting portion 9 each have a width in the perpendicular line A direction that is wider on the through-hole 7 side than in the corner section 5. As a result, whether the cutting conditions are small depth of cut or large depth of cut, the degree of deformation of the chips at the breaker of the rake surface 8 and the projecting portion 9 is optimized, and low cutting resistance and favorable chip processing performance are achieved.

Figure 4:
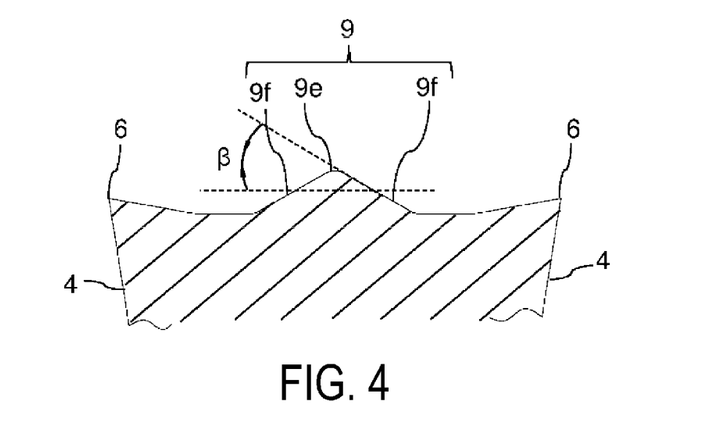
FIG. 4 is a Z-Z cross-sectional view of the cutting insert illustrating in FIG. 2.

In the present embodiment, an angle β of inclination of the projecting portion 9 in FIG. 4, which is a cross section (Z-Z cross section) along the perpendicular line A, is from 20 to 45°. The angle β of inclination is defined as the angle of inclination at a middle height position of the projecting portion 9. Further, in the present embodiment, the projecting portion 9 is formed by two inclined planer surfaces 9*f* and an intersecting ridge portion 9*e* formed by the intersection of the two inclined planer surfaces 9*f*, and the intersecting ridge portion 9*e* has a round curved surface shape. This makes it possible to achieve a favorable chip flow, chip processing under a wide range of cutting conditions, and efficient cut processing. The intersecting ridge portion 9*e* does not necessarily have a round curved surface shape, and may have a shape formed by a sharp corner portion.

Furthermore, according to the present embodiment, a height of the projecting portion 9, with the bottom surface 3 serving as reference, at a position at least 30 to 80% from the corner section 5 side with respect to the length L3 between the end 9*a* of the projecting portion 9 and the tip 5*a* of the corner section 5 gradually decreases toward the through-hole 7 side. Under such conditions, the chips produced during small depth machining are curled by the rake surface 8 and the projecting portion 9 located near the corner section 5 in a stable manner. On the other hand, during large depth machining, the rake surface 8 (first rake surface 8*a* and second rake surface 8*b*) and the projecting portion 9, at positions separated from the corner section 5, also contribute to the deformation of chips. With the widths of the first rake surface 8*a* and the second rake surface 8*b* in the perpendicular line A direction being wide, the chips are gently and greatly deformed at the first rake surface 8*a* and the second rake surface 8*b*. As a result, even if the height of the projecting portion 9 on the through-hole 7 side is low, the chips can be reliably curled. Further, under large depth of cut cutting conditions, the chips hit the nearby projecting portion 9 from the cutting edge 6 on the side of the cutting edge 6 near the corner section 5. Under such conditions as well, because the overall height of the projecting portion 9 is low in the present embodiment, the chips do not suddenly deform, nor does the cutting resistance increase. As a result, low cutting resistance and favorable chip processing can be achieved under a wide range of cutting conditions.

The maximum height of the projecting portion 9 either protrudes at a height of 0.05 mm or less with respect to the height of the corner section 5 with the bottom surface 3 serving as reference, or is less than or equal to the height of the corner section 5. As a result, even under small depth of cut cutting conditions, the chips do not suddenly deform by the projecting portion 9, nor does the cutting resistance increase more than necessary. Further, even under large depth of cut cutting conditions, the cutting resistance does not increase. As a result, the effect of improving the wear resistance of the cutting edge 6 is achieved.

The top edge section 11 of the through-hole 7 is recessed downward in a vicinity of the intersection point 12 located on the bisector B. That is, the height near the intersection point 12 of the top edge section 11 is low with respect to that of the middle surface 14, resulting in a stepped surface 16 that is lower than the middle surface 14. As a result, the existence of a sharp section between the top edge section 11 of the through-hole 7 and the end 9*a* of the projecting portion 9 can be suppressed, thereby suppressing the occurrence of chipping at the stepped surface 16. Note that the height near the intersection point 12 is disposed so as to be greater than the height of a screw member (not illustrated) inserted into the through-hole 7.

In the present embodiment, a length L4 of the stepped surface 16 that passes through the bisector B is 20% or less, particularly from 5 to 15%, by ratio (L4/L1) with respect to L1. The projecting portion 9 thus exists to a position near the through-hole 7, making it possible to achieve favorable chip processing under a wide range of cutting conditions. Note that the stepped surface 16 is preferably parallel to the bottom surface 3, but may be inclined so that the through-hole 7 side is higher.

In the present embodiment, the middle surface 14 on the through-hole 7 side surrounded between the two wall sections 10 of the top surface 2 is a flat surface parallel to the bottom surface 3, and has the highest height with respect to the bottom surface 3. This middle surface 14, during the manufacture of the insert 1, serves as a placement surface when inserting the insert 1 into a jig during machining, and can be utilized as a machining reference plane. A depression 15 for differentiating the two corner sections 5 is provided in the middle surface 14 of the insert 1.

In the present embodiment, as illustrated in FIG. 2B, a height of the cutting edge 6 increasingly decreases further away from the corner section 5. This improves sharpness. Note that the cutting edge 6 is not limited to the configuration illustrated in the present embodiment, and the height of the cutting edge 6 may be the same further away from the corner section 5, for example.

Further, the insert 1 of the present embodiment is a so-called positive-type insert having a positive clearance angle. Specifically, the position of each side surface 4 that comes into contact with the cutting edge 6 is inclined so as to have a clearance angle and, as illustrated in FIG. 2B, the angle formed by the top surface 2 and each side surface 4 is less than 90°. The present invention, however, is not limited to the positive-type insert, and may be a so-called negative-type insert having a clearance angle of zero. Furthermore, while the insert 1 of the present embodiment has a shape disposed in a position linearly symmetrical with respect to the bisector B of the corner section 5, except for the depression 15, the present invention is not limited thereto. For example, the insert 1 may be a handed insert having only one of the two ridge portions connected to the corner section 5 used as a cutting edge. In this case, the shape of the corner section 5 is not necessarily linearly symmetrical with respect to the bisector B.

Further, while the top surface 2 is formed into a substantially rhombic shape (C type of the ISO standard) in the embodiment described above, the present invention is not limited thereto. The top surface 2 may be formed into other substantially polygonal shapes, such as a substantially triangular or rectangular shape, as long as the shape includes the corner section 6. Further, the shape may be another substantially rhombic shape such as illustrated in FIG. 5 (type D of the ISO standard).

Figure 5:
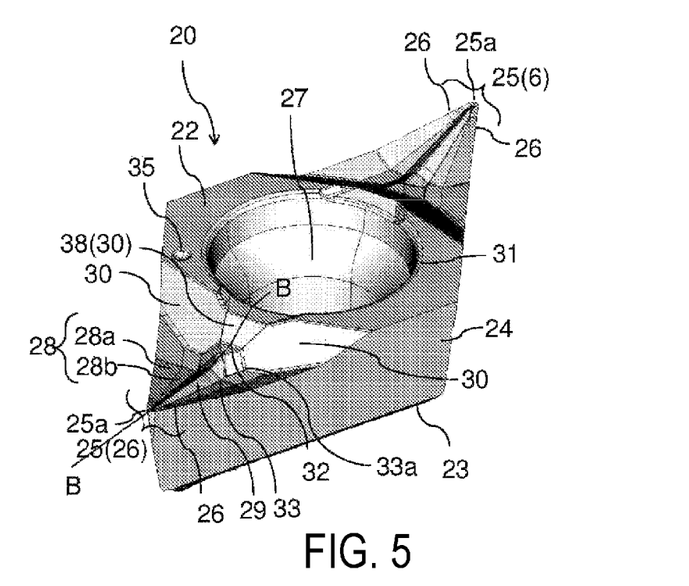
FIG. 5 is a schematic perspective view of another example of the cutting insert according to the present invention.

An insert 20 of type D in FIG. 5 is provided with substantially rhombic shaped top surface 22, a bottom surface 23, side surface 24, and cutting edge 26 provided to at least a corner section 25; a through-hole 27; rake surfaces 28; projecting portions 29; wall sections 30; a top edge section 31 of the through-hole 27; boundary lines 33 between each of the rake surfaces 28 and the projecting portions 29; and intersection points 32 of the top edge section 31 of the through-hole 27 and each of the bisectors B of the corner sections 25. In the insert 20 of FIG. 5, the wall section 30 includes not two surfaces as in FIG. 1, but three surfaces, including a middle surface 38 provided to a middle section that passes through the bisector B. Further, the area behind the protruding section 29 is also formed by three surfaces, and the three surfaces are each connected to the three surfaces of the wall section 30. All other components of the insert 20 have the same layout as those of the insert 1 in FIGS. 1 to 3.

Figure 6:
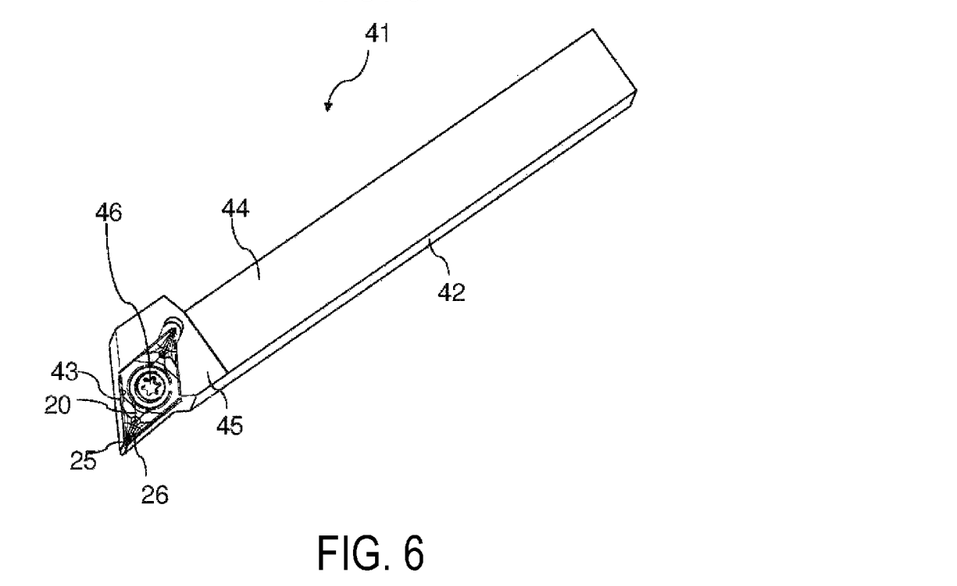
FIG. 6 is a schematic perspective view of the cutting tool with the cutting insert in FIG. 5 mounted to a holder.

Next, description will be given of a cutting tool 41 of an embodiment according to the present invention on the basis of a schematic perspective view of the cutting tool 41 in FIG. 6. The cutting tool 41 includes a holder 42 and the insert 20 of type D described above. The holder 42 includes an insert attaching portion 45 on the tip side of a shank 44, and the insert attaching portion 45 includes an insert pocket 43. The insert pocket 43 is open toward a top surface, one side surface, and a tip surface of the holder 42. The insert 20 is mounted to the insert pocket 43 so that the cutting edge 26 protrudes from an outer peripheral portion of the holder 42. Specifically, the corner section 25 of the insert 20 is disposed on a tip side and one side surface side of the holder 42. Then, a linear section of the cutting edge 26 of the insert 20 away from the corner section 25 is disposed along one side surface of the holder 42.

In the present embodiment, the insert pocket 43 of the holder 42 has a screw hole (not illustrated). The insert 20 is mounted to the insert pocket 43 of the holder 42 by inserting a fixing screw 46 into the through-hole 27 of the insert 20 and screwing the fixing screw 46 into the screw hole.

The cutting tool 41 is provided with the insert 20 or the insert 1 described above, and therefore is capable of exhibiting excellent chip dischargeability under a wide range of cutting conditions. In particular, when the cutting tool 41 is used to perform cut processing on a workpiece having relatively high ductility, such as a low carbon steel, the cutting tool 41 can curl the chips in a stable manner. This increases machining accuracy, making it possible to suppress cutting edge damage. As a result, the tool life is extended.

Method for Manufacturing a Machined Product

Figure 7A:
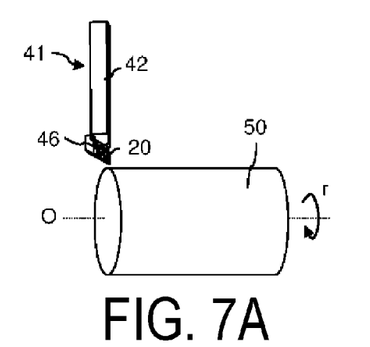
FIGS. 7A to 7C are diagrams for explaining the method for manufacturing a machined product in an embodiment of the present invention, each being a schematic view illustrating one step of the manufacturing method.
Figure 7B:
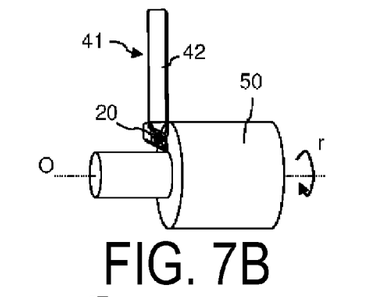
Figure 7C:
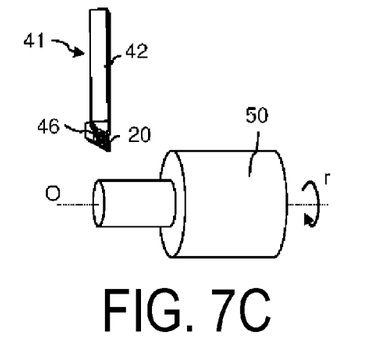

A detailed description will now be given of the method for manufacturing a machined product of the present embodiment with reference to FIGS. 7A to 7C. FIG. 7A is a diagram illustrating a step of bringing the cutting tool 41 close to a workpiece 50 in the direction Y. FIG. 7B is a diagram illustrating a step of bringing the cutting tool 41 into contact with the workpiece 50. FIG. 7C is a diagram illustrating a step of separating the cutting tool 41 from the workpiece 50 in the direction Z.

The method for manufacturing a machined product of the present embodiment includes the steps (i) to (iv) of:

(i) Disposing the cutting tool 41 above the prepared workpiece 50 (FIG. 7A).

(ii) Rotating the workpiece in the arrow r direction about a rotation axis O, and bringing the cutting tool 41 close to the workpiece 50 (FIG. 7A). This step can, for example, be performed by fixing the workpiece 50 on a table of a machine tool having the cutting tool 41 attached thereto and, with the workpiece 50 rotating, bringing the cutting tool 41 close to the workpiece 50. Note that, in this step, the workpiece 50 and the cutting tool 41 may be brought close to each other relatively or, for example, the cutting tool 41 may be fixed and the workpiece 50 may be brought close to the cutting tool 41.

(iii) Bringing the cutting tool 41 closer to the work material 50, thereby causing the cutting edge 26 of the cutting tool 41 to come into contact with the surface of the rotating work material 50 at a predetermined position, and cutting the work material 50 (FIG. 7B).

(iv) Moving the cutting tool 41 away from the through-hole 51 of the workpiece 50 (FIG. 7C). In this step as well, similar to the above step (ii), the workpiece 50 and the cutting tool 41 may be separated from each other relatively or, for example, the cutting tool 41 may be fixed and the workpiece 50 may be separated from the cutting tool 41.

According to the above steps, it is possible to exhibit excellent cutting performance. Note that, when the cut processing is repeatedly performed, a step of bringing the cutting edge 26 of the cutting tool 41 into contact with different locations on the work material 50 may be repeated with the rotating state of the cutting tool 50 maintained.

REFERENCE SIGNS LIST

1 Insert
2 Top surface
3 Bottom surface
4 Side surface
5 Corner section
5a Tip
6 Cutting edge
7 Through-hole
8 Rake surface
9 Projecting portion
9a End
10 Wall section
11 Top edge section
12 Intersection point
13 Boundary line between rake surface and projecting portion
13a End
A Perpendicular line perpendicular to bisector B
B Bisector
M Center point
L1 Length between intersection point between bisector of corner section and top edge section of through-hole, and tip of corner section
L2 Length parallel to bisector between end of boundary line and tip of corner section

The invention claimed is:

1. A cutting insert comprising:
a polygonal top surface;
a bottom surface;
a side surface in contact with the top surface and the bottom surface;
a cutting edge located at an intersection portion of the top surface and the side surfaces, and including at least a corner section of the top surface;
a through-hole located from the top surface to the bottom surface;
a projecting portion located on the top surface between the corner section and the through-hole; and
a rake surface located between the cutting edge and the projecting portion;
wherein
a boundary line is located between the rake surface and the projecting portion, and comprises a first end on a through-hole side,
in a top view, a bisector of the corner section:
intersects the cutting edge at a first point; and
intersects a top edge section of the through-hole at a second point, the first end is located between the through-hole and a perpendicular line that passes through a midpoint of a line segment connecting the first point and the second point, the rake surface comprises:
- a first rake surface in contact with the cutting edge; and
- a second rake surface between the projecting portion and the first rake surface, the first rake surface inclines downward from the cutting edge toward the second rake surface in a first cross section perpendicular to the bisector;

a height of the second rake surface, remains the same, relative to the bottom surface, between the first rake surface and the projecting portion in the first cross section, and the second rake surface inclines downward toward the through hole in a second cross section parallel to the bisector.

2. The cutting insert according to claim 1, wherein
a length of the line segment is defined as L1,
a length between the first end and the first point in a direction parallel to the bisector is defined as L2, and
a ratio L2/L1 is from 60 to 85%.

3. The cutting insert according to claim 2, wherein
the projecting portion comprises an end on the bisector between the through-hole and the perpendicular line,
a length between the end of the projecting portion and the first point is defined as L3, and
a ratio L3/L1 is from 65 to 90%.

4. The cutting insert according to claim 3, wherein the length L2 is shorter than the length L3.

5. The cutting insert according to claim 4, wherein a ratio L2/L3 of the length L2 to the length L3 is from 70 to 95%.

6. The cutting insert according to claim 1, further comprising a wall section that:
- is located between the projecting portion and the top edge section of the through-hole;
- inclines downward from the top edge section of the through-hole toward the cutting edge;
- has a width greater than zero in the top view; and
- is connected to the side surface.

7. The cutting insert according to claim 6, wherein the width of the wall section is the smallest on the line segment in the top view.

8. The cutting insert according to claim 6, wherein a distance between the wall section and the perpendicular line increases as a distance from the bisector increases.

9. The cutting insert according to claim 1, wherein in the top view, the first rake surface and the second rake surface each have a width in a direction perpendicular to the line segment, and each width is wider on the through-hole side than in the corner section.

10. The cutting insert according to claim 1, wherein
the projecting portion comprises an end on the bisector between the through-hole and the perpendicular line,
a length between the end of the projecting portion and the first point is defined as L3, and
a height of the projecting portion relative to the bottom surface gradually decreases toward the through-hole at a position 30% to 80% from the corner section with respect to the length L3.

11. The cutting insert according to claim 1, wherein the top edge section of the through-hole is recessed downward in the second point.

12. The cutting insert according to claim 1, wherein
the projecting portion has a first height which is a maximum height relative to the bottom surface,
the corner section has a second height relative to the bottom surface, and
the first height is larger than the second height by 0.05 mm or less.

13. The cutting insert according to claim 1, wherein an angle of inclination of the projecting portion is from 20 to 45° in the first cross section.

14. The cutting insert according to claim 1, wherein the projecting portion comprises two inclined flat surfaces, and an intersecting ridge portion where the two inclined planer surfaces intersect.

15. The cutting insert according to claim 14, wherein the intersecting ridge portion has a round curved surface shape.

16. The cutting insert according to claim 1, wherein
the projecting portion has a first height which is a maximum height relative to the bottom surface,
the corner section has a second height relative to the bottom surface, and
the first height is not larger than the second height.

17. A cutting tool comprising:
a holder; and
the cutting insert according to claim 1 located on a tip side of the holder.

18. A method for manufacturing a machined product, comprising:
rotating a workpiece;
bringing the cutting edge of the cutting insert of the cutting tool according to claim 17 into contact with the rotating workpiece; and
separating the cutting tool from the workpiece.

* * * * *